United States Patent
Liu et al.

(10) Patent No.: US 11,666,949 B1
(45) Date of Patent: Jun. 6, 2023

(54) MODULAR MECHANICAL ARM FOR ADAPTIVE CLEANING AND DAMAGE DETECTION OF UNDERWATER PILE FOUNDATION

(71) Applicant: Guangzhou University, Guangzhou (CN)

(72) Inventors: Airong Liu, Guangzhou (CN); Jiaqiao Liang, Guangzhou (CN); Jiyang Fu, Guangzhou (CN); Guowei Liu, Guangzhou (CN); Junda Chen, Guangzhou (CN); Bingcong Chen, Guangzhou (CN)

(73) Assignee: GUANGZHOU UNIVERSITY, Guangzhou (CN)

( * ) Notice: Subject to any disclaimer, the term of this patent is extended or adjusted under 35 U.S.C. 154(b) by 0 days.

(21) Appl. No.: 17/818,304

(22) Filed: Aug. 8, 2022

(30) Foreign Application Priority Data

Mar. 31, 2022 (CN) .......................... 202210333491.6

(51) Int. Cl.
*B08B 1/00* (2006.01)
*B25J 18/00* (2006.01)
*B63G 8/00* (2006.01)

(52) U.S. Cl.
CPC ............... *B08B 1/005* (2013.01); *B25J 18/00* (2013.01); *B63G 8/001* (2013.01)

(58) Field of Classification Search
CPC .......... B08B 1/005; B25J 18/00; B63G 8/001
See application file for complete search history.

(56) References Cited

U.S. PATENT DOCUMENTS

| 4,502,407 A | * | 3/1985 | Stevens | ............... E02B 17/0034 348/81 |
| 11,534,907 B2 | * | 12/2022 | Yamashita | ............. B25J 9/1612 |

FOREIGN PATENT DOCUMENTS

| AU | 2021107149 A4 | * | 12/2021 | |
| CN | 110479653 A | * | 11/2019 | ............. B08B 1/005 |
| CN | 110626480 A | * | 12/2019 | ............. B08B 1/005 |
| CN | 111389771 A | * | 7/2020 | ............. B08B 1/005 |
| CN | 112354912 A | * | 2/2021 | |
| CN | 112354926 A | * | 2/2021 | |
| CN | 112357026 A | * | 2/2021 | |
| CN | 112627146 A | * | 4/2021 | ............. B08B 1/001 |
| CN | 113148079 A | * | 7/2021 | |

(Continued)

OTHER PUBLICATIONS

CN-113663953-B—English Machine Translation (Year: 2022).*

*Primary Examiner* — Marc Carlson
(74) *Attorney, Agent, or Firm* — Getech Law LLC; Jun Ye

(57) ABSTRACT

A modular mechanical arm of an underwater pile foundation structure includes a modular interface disposed at one end of the transmission arm rod, a mechanical arm connecting part disposed at the other end of the transmission arm rod. The mechanical arm connecting part is separately provided with two arm frames, each of the arm frames comprises an inner arm frame and an outer arm frame, the inner arm frame and the outer arm frame are coupled by a joint, and a soft moving and cleaning part is disposed on an inner side of each of the arm frames; the modular interface is coupled with an underwater UAV interface to transmit current and a control signal, a waterproof steering gear is built in the transmission arm rod to receive the control signal.

5 Claims, 3 Drawing Sheets

(56) References Cited

FOREIGN PATENT DOCUMENTS

| | | | |
|---|---|---|---|
| CN | 113522808 A | * | 10/2021 |
| CN | 113635342 A | * | 11/2021 |
| CN | 113663953 B | * | 6/2022 |
| JP | 2013202541 A | * | 10/2013 |
| WO | WO-2022192938 A1 | * | 9/2022 |

* cited by examiner

MODULAR MECHANICAL ARM FOR ADAPTIVE CLEANING AND DAMAGE DETECTION OF UNDERWATER PILE FOUNDATION

TECHNICAL FIELD

The invention relates to the technical field of mechanical arms, in particular to a modular mechanical arm for adaptive cleaning and damage detection of an underwater pile foundation structure.

BACKGROUND

As important constituent parts of a bridge, a drilling platform and a wharf structure, pile foundations play an important role in transferring superstructure load to a base. The development of damage by diseases to the pile foundation directly affects the practicability and durability of a bridge structure, and even endangers its operational safety in severe cases. The types of corrosion of the underwater pile foundation mainly include physical corrosion, chemical corrosion, biological corrosion, etc., among which biological corrosion has a very serious impact on the bridge pile foundation. Biological corrosion refers to the direct and indirect corrosion of materials caused by substances produced in the processes of attachment, growth, reproduction, metabolism and death of organisms attached to a material surface of the bridge pile foundation. The causes of biological corrosion can be roughly classified as follows: chlorophyll plants in water can increase the oxygen content in seawater, $CO_2$ released by underwater organisms can make the surrounding seawater more acidic, and the death and decay of underwater organisms can produce acidic substances and $H_2S$, which all can accelerate the corrosion. In addition, some underwater organisms can damage the paint or coating on a metal surface, and some microorganisms themselves have a corrosive effect on metal. Taking the underwater pile foundation of the bridge as an example, biological corrosion will result in deterioration of reinforced concrete of the bridge pile foundation, which will seriously affect the durability of the pile foundation if no measures are taken. Therefore, underwater creatures should be kept away from the bridge pile foundation structure as far as possible. In this regards, this technology is a fast, effective and reliable cleaning device, which can prolong the service life of the bridge pile foundation, ensure the safety and durability of the structure and save the cost.

There are now two cleaning technologies widely used: a physical cleaning technology and an anti-fouling coating technology. The physical cleaning technology mainly means that a human dives directly into the water and cleans eroded parts of a surface of the pile foundation with tools, or employs mechanical equipment to clean and scrape the surface of the pile foundation. With this method, the time for underwater organisms to adhere to the underwater bridge pile foundation can be reduced, and then the adverse effects of biological corrosion on the underwater pile foundation of the bridge can be reduced, the durability of the bridge can be improved, and the bearing capacity of the bridge pile foundation can be ensured. The anti-fouling coating technology is to coat a green anti-corrosion coating on the surface of the underwater pile foundation of the bridge. Mainly through the electrochemical principle, it plays a very good role in neutralizing and preventing the substrate potential from rising. In addition, the anti-corrosion coating can also avoid the pinhole of the coating, and the coating has high hardness, wear resistance, impact resistance and long acid-base aging resistance. Thus, the durability of the underwater pile foundation of the bridge is improved and the bearing capacity of the bridge pile foundation is ensured.

However, the two common cleaning technologies mentioned above have some defects, which cannot reasonably solve practical engineering problems as follows.

At present, cleaning tools used for cleaning by labor and mechanical equipment are generally hard blades, etc., which may cause physical damage to the underwater pile foundation structure of the bridge in a cleaning process, and it is most probably that attached substances are remained when being cleaned due to problems such as difficulty in fitting the pile foundation.

The quality and durability of a coating used in a coating protection method are the main factors of the anti-corrosion effect, and it is difficult to guarantee the performance. The coating protection method has a limited effect in dealing with the corroded underwater pile foundation, and cannot repair the damaged pile foundation.

The physical cleaning technology currently lacks devices that can detect and monitor the underwater pile foundation of a bridge in real time when working underwater such that it is impossible to accurately know the corroded degree and cleaned condition of the underwater pile foundation, and it often needs manual operation, resulting in high project cost inconvenience in reality.

SUMMARY

The content of the present invention is to provide a modular mechanical arm for adaptive cleaning and damage detection of an underwater pile foundation structure, which can overcome some or certain defects in the prior art.

The modular mechanical arm for the adaptive cleaning and damage detection of the underwater pile foundation structure according to the present invention comprises a transmission arm, wherein a modular interface is disposed at one end of the transmission arm rod, a mechanical arm connecting part is disposed at the other end of the transmission arm rod, the mechanical arm connecting part is separately provided with two arm frames, each of the arm frames comprises an inner arm frame and an outer arm frame, the inner arm frame and the outer arm frame are coupled by a joint, and a soft moving and cleaning part is disposed on an inner side of each of the arm frames;

the modular interface is coupled with an underwater unmanned aerial vehicle (UAV) interface to transmit current and a control signal, a waterproof steering gear is built in the transmission arm rod to receive the control signal, a gear transmission system built in the mechanical arm connecting part is driven to realize the opening and closing of the two arm frames, and the soft moving and cleaning part is fastened to three sliding blocks capable of moving relatively.

Preferably, the mechanical arm connecting part is embedded with a searchlight and a first waterproof camera for compensating a visual field for manipulating the arm frames.

Preferably, the soft moving and cleaning part comprises a soft portion, a frosted layer is disposed on a surface of the soft portion, a scraper-like blade is disposed on the frosted layer, and the surface of the scraper-like blade is plated with a metal layer.

Preferably, a first waterproof motor is built in the joint, and the first waterproof motor controls a relative angle between the two arm frames.

Preferably, the inner arm frame and the outer arm frame are each internally provided with a support frame separately, a second waterproof camera is disposed on the support frame, and the second waterproof camera is responsible for collecting surface information after the cleaning work is completed.

Preferably, each of the arm frames is provided with a screw and two sliding grooves, the screw is connected with a second waterproof motor, the screw is matched with the sliding block in the middle, and the other two sliding blocks are matched with the corresponding sliding.

Preferably, the three sliding blocks are fixed by adhesive strips and kept on a same horizontal plane.

According to the present invention, the modular mechanical arm for the adaptive cleaning and damage detection of the underwater pile foundation structure is carried to an underwater robot, so that the working efficiency of this kind of cleaning is greatly improved, the operation safety is improved and the labor cost is reduced.

According to the present invention, an adaptive structure of the mechanical arm is controlled to be clung to the surface of the pile foundation to be treated, the soft moving and cleaning part moves to complete the cleaning of the surface of the pile foundation, and at the same time, the second waterproof cameras built in the arm frames collect data of corrosion of the surface of the pile foundation, so that a plurality of tasks are carried out in parallel, and the working efficiency of this work is improved.

According to the present invention, by adjusting the relative angles between the inner arm frame and the outer arm frame, and between the arm frame and the mechanical arm connecting part, the soft moving and cleaning part fixed to the arm frame will deform correspondingly. When a pile with a different radius is encountered, by adjusting the two relative angles, the soft moving and cleaning part can be adjusted to adhere to the surface of the pile foundation to be cleaned, thus greatly reducing the cost for equipment adjustment.

According to the present invention, most of the cleaning work on the surface of the pile foundation can be realized through the designed soft adhesive strips with plating layers. The lower structure plated with the metal layer of the scraper-like blade is responsible for preliminary cleaning of the surface of the pile foundation, and the upper frosted layer is responsible for smoothing the cleaned surface and cleaning the residual attached substances.

DETAILED DESCRIPTION OF EMBODIMENTS

In order to further understand the content of the present invention, the present invention will be described in detail with reference to the drawings and embodiments. It should be understood that the embodiments are illustrative of the present invention and not restrictive.

Embodiment 1

Figure 1:
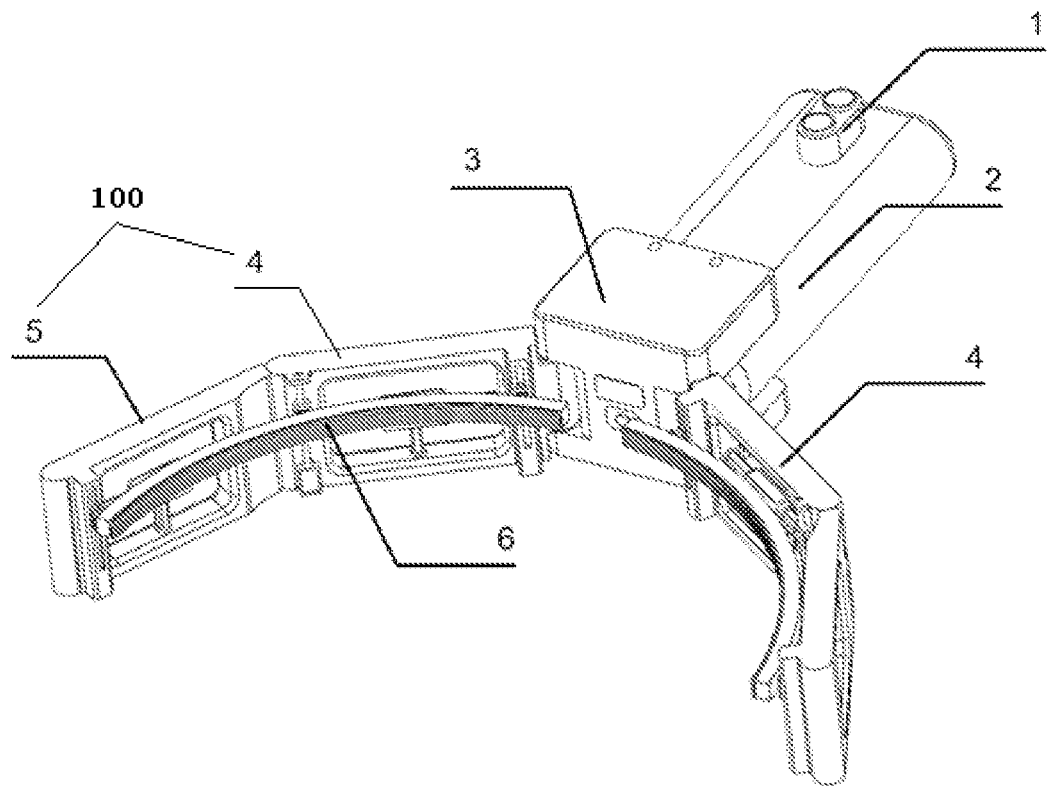
FIG. 1 is a perspective structural diagram of a modular mechanical arm for adaptive cleaning and damage detection of an underwater pile foundation structure in Embodiment 1.
Figure 2:
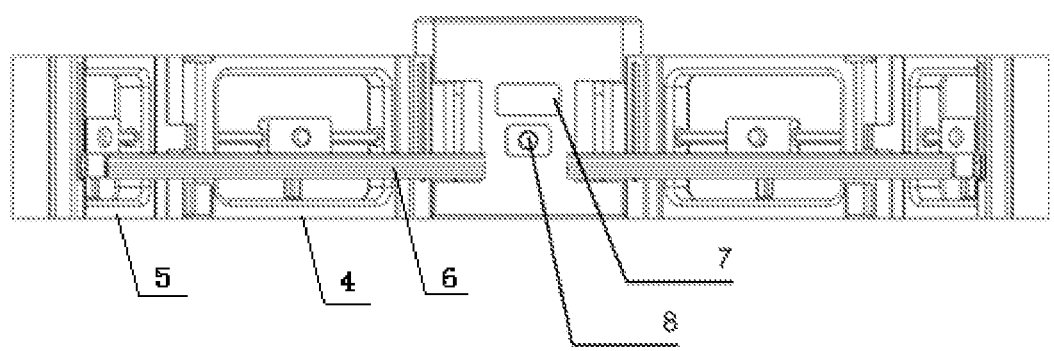
FIG. 2 is a structural diagram of an arm frame in Embodiment 1.
Figure 3:
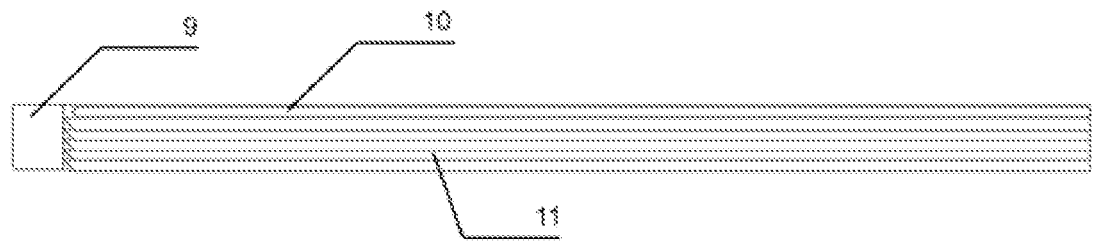
FIG. 3 is a structural diagram of a soft moving and cleaning part in Embodiment 1.
Figure 4:
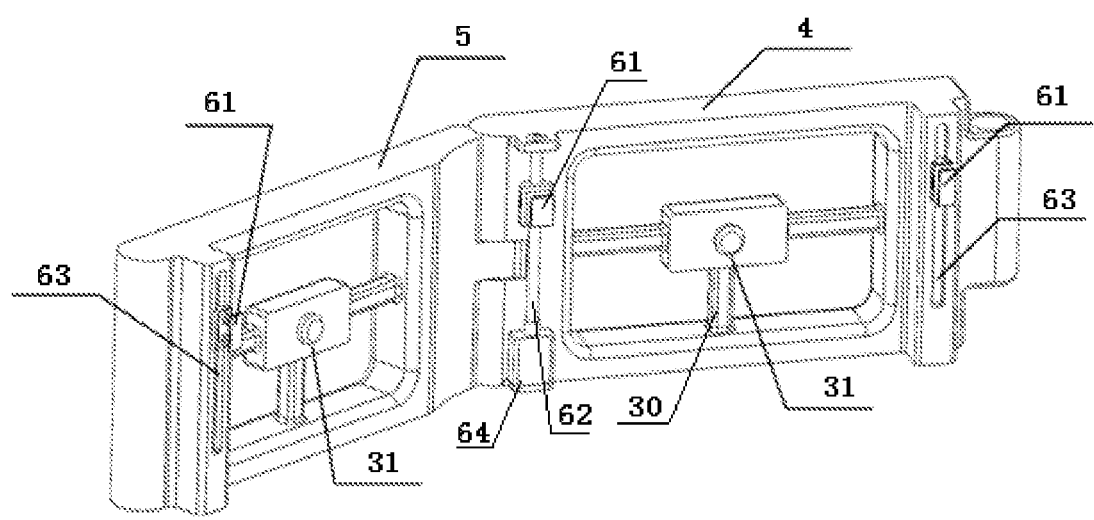
FIG. 4 is a perspective structural diagram of the arm frame in Embodiment 1.
Figure 5:
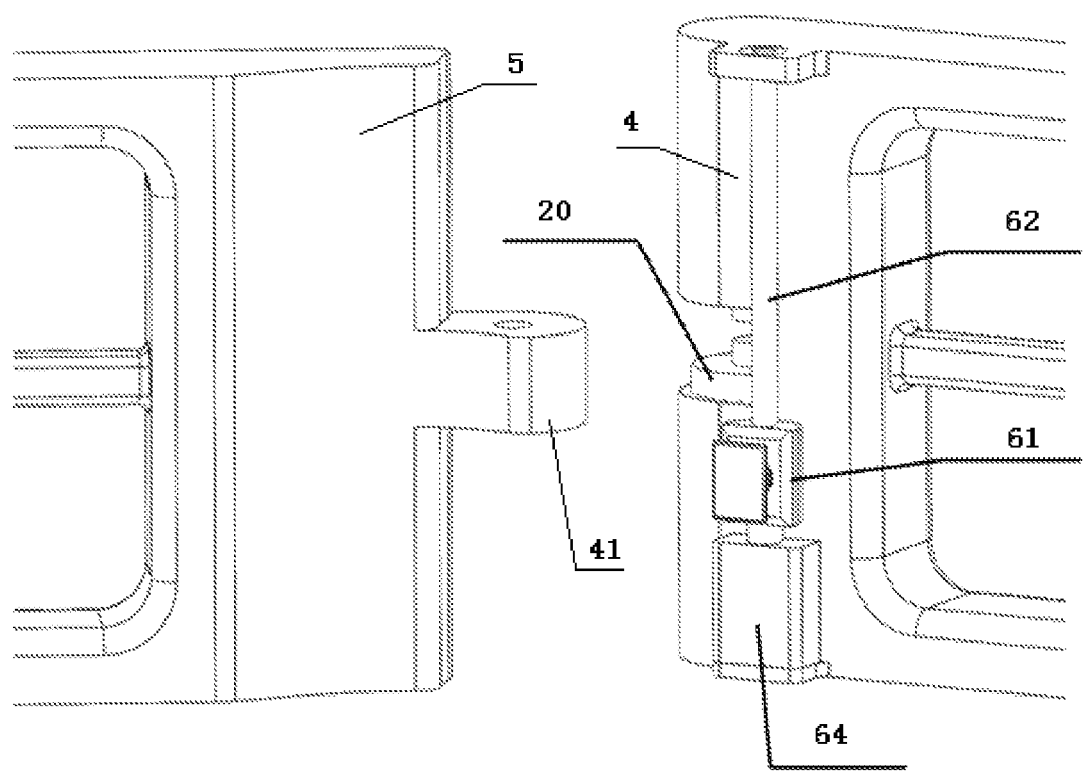
FIG. 5 is a structural diagram of a joint in Embodiment 1.

As shown in FIGS. 1-5, this embodiment provides a modular mechanical arm for adaptive cleaning and damage detection of an underwater pile foundation structure, comprising a transmission arm rod 2, wherein a modular interface 1 is disposed at one end of the transmission arm rod 2, a mechanical arm connecting part 3 is disposed at the other end of the transmission arm rod 2, the mechanical arm connecting part 3 is separately provided with two arm frames 100, each of the arm frames 100 comprises an inner arm frame 4 and an outer arm frame 5, the inner arm frame 4 and the outer arm frame 5 are coupled by a joint 41, and a soft moving and cleaning part 6 is disposed on an inner side of each of the arm frames 100;

the modular interface 1 is coupled with an underwater UAV interface to transmit current and a control signal, a waterproof steering gear is built in the transmission arm rod 2 to receive the control signal, a gear transmission system built in the mechanical arm connecting part 3 is driven to realize the opening and closing of the two arm frames 100, and the soft moving and cleaning part 6 is fastened to three sliding blocks 61 capable of moving relatively.

The mechanical arm connecting part 3 is embedded with a searchlight 7 and a first waterproof camera 8 for compensating a visual field for manipulating the arm frames 100.

The soft moving and cleaning part 6 comprises a soft portion 9, a frosted layer 10 is disposed on a surface of the soft portion 9, a scraper-like blade 11 is disposed on the frosted layer 10, and the surface of the scraper-like blade 11 is plated with a metal layer. The scraper-like blade 11 can finish preliminary cleaning of a surface of a pile foundation; the frosted layer 10 has a rectangular cross section, and is responsible for smoothing the surface of the pile foundation after the preliminary cleaning and for cleaning the residual attached substances; and the soft moving and cleaning part 6 is a replaceable part, which can be replaced in time after the metal coating on the surface is worn after repeated use.

A first waterproof motor 20 is built in the joint 41, and the first waterproof motor 20 controls a relative angle between the two arm frames 100.

The inner arm frame 4 and the outer arm frame 5 are each internally provided with a support frame 30 separately, a second waterproof camera 31 is disposed on the support frame 30, and the second waterproof camera 31 is responsible for collecting surface information after the cleaning work is completed.

Each of the arm frames 100 is provided with a screw 62 and two sliding grooves 63, the screw 62 is connected with a second waterproof motor 64, the screw 62 is matched with the sliding block 61 in the middle, and the other two sliding blocks 61 are matched with the corresponding sliding grooves 63.

The three sliding blocks 61 are fixed by adhesive strips and kept on a same horizontal plane.

In this embodiment, the modular mechanical arm for adaptive cleaning and damage detection of the underwater pile foundation structure is carried to an underwater robot, so that the working efficiency of this kind of cleaning is greatly improved, the operation safety is improved and the labor cost is reduced.

In this embodiment, an adaptive structure of the mechanical arm is controlled to be clung to the surface of the pile foundation to be treated, the soft moving and cleaning part 6 moves to complete the cleaning of the surface of the pile foundation, and at the same time, the second waterproof cameras 31 built in the arm frames 100 collect data of corrosion of the surface of the pile foundation, so that a plurality of tasks are carried out in parallel, and the working efficiency of this work is improved.

In this embodiment, by adjusting the relative angles between the inner arm frame 4 and the outer arm frame 5, and between the arm frame 100 and the mechanical arm connecting part 3, the soft moving and cleaning part 6 fixed to the arm frame 100 will deform correspondingly. When a pile with a different radius is encountered, by adjusting the two relative angles, the soft moving and cleaning part 6 can be adjusted to adhere to the surface of the pile foundation to be cleaned, thus greatly reducing the cost for equipment adjustment.

In this embodiment, most of the cleaning work on the surface of the pile foundation can be realized through the designed soft adhesive strips with plating layers. The lower structure plated with the metal layer of the scraper-like blade is responsible for preliminary cleaning of the surface of the pile foundation, and the upper frosted layer 10 is responsible for smoothing the cleaned surface and cleaning the residual attached substances.

The present invention and its embodiments have been described above schematically, and the description is not intended to be limiting, and what is shown in the drawings is only one of the embodiments of the present invention, and the actual structure is not limited thereto. Therefore, without departing from the purpose of the present invention, any structural modes and embodiments similar to this technical solution designed by those of ordinary skill in the art inspired by the invention without creative labor shall belong to the protection scope of the present invention.

The invention claimed is:

1. A modular mechanical arm for adaptive cleaning and damage detection of an underwater pile foundation structure, characterized by comprising a transmission arm rod, wherein a modular interface is disposed at one end of the transmission arm rod, a mechanical arm connecting part is disposed at the other end of the transmission arm rod, the mechanical arm connecting part is separately provided with two arm frames, each of the arm frames comprises an inner arm frame and an outer arm frame, the inner arm frame and the outer arm frame are coupled by a joint, and a soft moving and cleaning part is disposed on an inner side of each of the arm frames;

the modular interface is coupled with an underwater UAV interface to transmit current and a control signal, a waterproof steering gear is built in the transmission arm rod to receive the control signal, a gear transmission system built in the mechanical arm connecting part is driven to realize the opening and closing of the two arm frames, and the soft moving and cleaning part is fastened to three sliding blocks capable of moving relatively, wherein the mechanical arm connecting part is embedded with a searchlight and a first waterproof camera for compensating a visual field for manipulating the arm frames, wherein the soft moving and cleaning part comprises a soft portion, a frosted layer is disposed on a surface of the soft portion, a scraper-like blade is disposed on the frosted layer, and a surface of the scraper-like blade is plated with a metal layer.

2. The modular mechanical arm for the adaptive cleaning and damage detection of the underwater pile foundation structure according to claim 1, characterized in that a first waterproof motor is built in the joint, and the first waterproof motor controls a relative angle between the two arm frames.

3. The modular mechanical arm for the adaptive cleaning and damage detection of the underwater pile foundation structure according to claim 2, characterized in that the inner arm frame and the outer arm frame are each provided with a support frame, a second waterproof camera is disposed on the support frame, and the second waterproof camera is responsible for collecting surface information after cleaning work is completed.

4. The modular mechanical arm for the adaptive cleaning and damage detection of the underwater pile foundation structure according to claim 3, characterized in that each of the arm frames is provided with a screw and two sliding grooves, the screw is connected with a second waterproof motor, the screw is matched with the sliding groove in the middle, and the other two sliding blocks are matched with the corresponding sliding grooves.

5. The modular mechanical arm for the adaptive cleaning and damage detection of the underwater pile foundation structure according to claim 4, characterized in that the three sliding blocks are fixed by adhesive strips and kept on a same horizontal plane.

* * * * *